United States Patent
Blencoe et al.

(10) Patent No.: US 8,152,895 B2
(45) Date of Patent: Apr. 10, 2012

(54) PRODUCTION OF MAGNESIUM METAL (75) Inventors: James G. Blencoe, Harriman, TN (US); Lawrence M. Anovitz, Knoxville, TN (US); Donald A. Palmer, Oliver Springs, TN (US); James S. Beard, Martinsville, VA (US)

(73) Assignees: UT-Battelle, LLC, Oak Ridge, TN (US); University of Tennessee Research Foundation, Knoxville, TN (US); Virginia Museum of Natural History Foundation, Martinsville, VA (US)

( * ) Notice: Subject to any disclaimer, the term of this patent is extended or adjusted under 35 U.S.C. 154(b) by 10 days.

(21) Appl. No.: 12/709,726

(22) Filed: Feb. 22, 2010

(65) Prior Publication Data
US 2010/0233017 A1  Sep. 16, 2010

Related U.S. Application Data (63) Continuation-in-part of application No. 11/119,536, filed on Apr. 29, 2005, now Pat. No. 7,666,250, and a continuation-in-part of application No. 10/706,583, filed on Nov. 12, 2003, now abandoned.

(60) Provisional application No. 60/566,993, filed on Apr. 30, 2004.

(51) Int. Cl.
*C22B 26/00* (2006.01)
(52) U.S. Cl. .......................................... 75/594; 75/597
(58) Field of Classification Search .................. 75/594, 75/597
See application file for complete search history.

(56) References Cited

U.S. PATENT DOCUMENTS

| | | | |
|---|---|---|---|
| 3,447,973 A * | 6/1969 | De Long et al. | ............. 148/256 |
| 3,770,475 A | 11/1973 | Wuhrer et al. | |
| 4,124,683 A | 11/1978 | Lalancette | |
| 4,478,796 A | 10/1984 | Lalancette et al. | |
| 5,090,996 A | 2/1992 | Cameron | |
| 5,279,716 A | 1/1994 | Sharma | |
| 5,803,947 A * | 9/1998 | Engell et al. | ............. 75/10.33 |

(Continued)

FOREIGN PATENT DOCUMENTS
CA  2255287 A1  11/2000
(Continued)

OTHER PUBLICATIONS

Bearat H. et al., "Magnesium Hydroxide Dehydroxylation/Carbonation Reaction Processes: Implications for Carbon Dioxide Mineral Sequestration," J. Am. Ceram. Soc., vol. 85, No. 4, pp. 742-748, 2002.

(Continued)

*Primary Examiner* — George Wyszomierski
*Assistant Examiner* — Tima M McGuthry Banks
(74) *Attorney, Agent, or Firm* — MacMillan, Sobanski & Todd, LLC (57) ABSTRACT

A process of producing magnesium metal includes providing magnesium carbonate, and reacting the magnesium carbonate to produce a magnesium-containing compound and carbon dioxide. The magnesium-containing compound is reacted to produce magnesium metal. The carbon dioxide is used as a reactant in a second process. In another embodiment of the process, a magnesium silicate is reacted with a caustic material to produce magnesium hydroxide. The magnesium hydroxide is reacted with a source of carbon dioxide to produce magnesium carbonate. The magnesium carbonate is reacted to produce a magnesium-containing compound and carbon dioxide. The magnesium-containing compound is reacted to produce magnesium metal. The invention also relates to the magnesium metal produced by the processes described herein.

8 Claims, 4 Drawing Sheets

U.S. PATENT DOCUMENTS

| | | | |
|---|---|---|---|
| 7,666,250 B1 * | 2/2010 | Blencoe et al. | 75/594 |
| 2004/0213705 A1 | 10/2004 | Blencoe et al. | |
| 2005/0002847 A1 * | 1/2005 | Maroto-Valer et al. | 423/432 |
| 2007/0202032 A1 | 8/2007 | Geerlings et al. | |
| 2008/0110764 A1 | 5/2008 | Strezov et al. | |
| 2008/0112868 A1 | 5/2008 | Blencoe et al. | |

FOREIGN PATENT DOCUMENTS

| | | |
|---|---|---|
| EP | 0070711 A1 | 1/1983 |
| JP | 54058247 A | 5/1979 |
| WO | WO94/12266 | 6/1994 |
| WO | WO01/34294 A1 | 5/2001 |
| WO | WO02/085788 A1 | 10/2002 |

OTHER PUBLICATIONS

Butt, Daryl P. et al., "A Method for Permanent Disposal of CO2 in Solid Form," World Resource Review, vol. 9, No. 3, pp. 324-336, 1997.

Gerdemann, S.J. et al., "Carbon Dioxide Sequestration by Aqueous Mineral Carbonation of Magnesium Silicate Minerals," Proceedings of the 6th International Conference on Greenhouse Gas Control Technologies, Kyoto, Japan, pp. 1-6, Oct. 1, 2002.

Goff, Fraser et al., "Carbon Dioxide Sequestering Using Ultramafic Rocks," Environmental Geosciences, vol. 5, No. 3, pp. 89-101, 1998.

Goldberg, Philip et al., "A Program to Develop CO2 Sequestration via Mineral Carbonation," Proceedings of the 6th International Conference on Greenhouse Gas Control Technologies, Kyoto, Japan, pp. 1-6, Oct. 1, 2002.

Guthrie, Jr., George D. et al., "Geochemical Aspects of the Carbonation of Magnesium Silicates in an Aqueous Medium," NETL Conference on Carbon Sequestration, pp. 1-14, 2001.

Haywood, H.M. et al., "Carbon dioxide sequestration as stable carbonate minerals—environmental barriers," Environmental Geology, Springer-Verlag (http://link.springer.de), 10 pages, Aug. 21, 2001.

Jia, L. et al., "Mineral Carbonation and ZECA," Proceedings of the 6th International Conference on Greenhouse Gas Control Technologies, Kyoto, Japan, pp. 1-6, Oct. 1, 2002.

Kakizawa, M. et al., "A new CO2 disposal process via artificial weathering of calcium silicate accelerated by acetic acid," Energy, vol. 26, pp. 341-354, 2001.

Kojima, T. et al., "Absorption and Fixation of Carbon Dioxide by Rock Weathering," Energy Conyers. Mgmt., vol. 38, pp. S461-S466, 1997.

Lackner, Klaus S. et al., "Carbon Dioxide Disposal in Carbonate Minerals," Energy, vol. 20, No. 11, pp. 1153-1170, 1995.

Lackner, Klaus S. et al., "Magnesite Disposal of Carbon Dioxide," 22nd International Technical Conference on Coal Utilization and Fuel System, pp. 1-12, Mar. 16-19, 1997.

Lackner, Klaus S. et al., "Progress on Binding CO2 in Mineral Substrates," Energy Convers. Mgmt., vol. 38, Suppl., pp. S259-S264, 1997.

Lackner, Klaus S., "A Guide to CO2 Sequestration," Science, vol. 300, pp. 1677-1678, Jun. 13, 2003.

O'Connor, W.K. et al., "Carbon Dioxide Sequestration by Direct Mineral Carbonation: Results from Recent Studies and Current Status," Proceedings of First National Conference on Carbon Sequestration, May 14, 2001.

O'Connor, W.K. et al., "Carbon Dioxide Sequestration: Aqueous Mineral Carbonation Studies Using Olivine and Serpentine," Albany Research Center, National Energy Technology Laboratory: Mineral Carbonation Workshop, Aug. 8, 2001.

Seifritz, W., CO2 disposal by means of silicates, Nature, vol. 345, p. 486, Jun. 7, 1990.

Smithson, Gene L. et al., "Kinetics and Mechanism of Carbonation of Magnesium Oxide Slurries," Ind. Eng. Chem. Process Des. Develop., vol. 12, No. 1, pp. 99-106, 1973.

Wu, Jeffrey C.S. et al., "Feasibility of CO2 Fixation via Artificial Rock Weathering," Ind. Eng. Chem. Res., vol. 40, pp. 3902-3905, 2001.

Xiaoding, Xu et al., "Mitigation of CO2 by Chemical Conversion: Plausible Chemical Reactions and Promising Products," Energy and Fuels, vol. 10, pp. 305-325, 1996.

Dictionary.com, "serpentine," in Dictionary.com Unabridged (v.1,1). Source location: Random House, Inc., http://dictionary.reference.com/browse/serpentine. Available http://dictionary.reference.com. Accessed: Feb. 17, 2009.

International Search Report, Application No. PCT/US2011/025634, Date Feb. 22, 2011.

* cited by examiner

PRODUCTION OF MAGNESIUM METAL

CROSS-REFERENCE TO RELATED APPLICATIONS

This application is a continuation-in-part of U.S. utility application Ser. No. 11/119,536, filed Apr. 29, 2005, now U.S. Pat. No. 7,666,250, issued Feb. 23, 2010, which claims the benefit of U.S. provisional application Ser. No. 60/566,993, filed Apr. 30, 2004, now abandoned; and which in turn is a continuation-in-part of U.S. utility application Ser. No. 10/706,583, filed Nov. 12, 2003, now abandoned, which claimed the benefit of U.S. provisional application Ser. No. 60/464,728, filed Apr. 23, 2003, now abandoned.

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

This invention relates in general to processes of producing magnesium metal. The two main methods for producing magnesium metal involve reduction of either the oxide or the chloride. The first of these, known as the Pidgeon process, requires a strong reducing agent (usually silicon or ferrosilicon) and high temperatures (well over 1000° C.). The second route, which until recently was the principal means of magnesium production, relies on the electrolysis of molten magnesium chloride ($MgCl_2$), which forms molten magnesium metal at the cathode, and chlorine gas at the anode. The magnesium chloride required for the fused salt electrolysis can in turn be produced in several ways. The most direct method involves separation from seawater, or evaporation of natural brines, usually from salt lakes. Alternatively, magnesium chloride can be produced by treating magnesium carbonate (magnesite, $MgCO_3$), magnesium oxide (magnesia, MgO), or a magnesium silicate (especially serpentine, $Mg_3Si_2O_5(OH)_4$), with aqueous hydrochloric acid, as in the Magnola process. A process developed by the Australian Magnesium Corporation involves removal of water from hydrated magnesium chloride (bischofite, $MgCl_2 \cdot 6H_2O$) by azeotropic distillation with ethylene glycol, following which the magnesium chloride is precipitated from glycol solution as the hexammoniate by treatment with ammonia, and the ammoniate is decomposed to anhydrous magnesium chloride by heating. Yet another alternative process that avoids the need for the dehydration step is carbochlorination, whereby magnesium oxide is reacted with chlorine in the presence of carbon, producing magnesium chloride. A version of this reaction that involves magnesite in place of magnesia was the basis for the operation of a magnesium plant in Alberta, Canada. The direct electrolytic decomposition of MgO to Mg and $O_2$, in a cell containing an oxide-ion conducting ceramic electrolyte, is also possible (the EIMEx process).

A common feature of current technologies for producing magnesium is the generation of carbon dioxide ($CO_2$). Thus, production of magnesium chloride from magnesite by either calcination or acid treatment involves the evolution of one mole of $CO_2$ per mole of magnesium chloride, and if dolomite is used there are two moles of $CO_2$ produced; the same is also true for the carbochlorination of magnesite. Although the oxygen in the magnesia feedstock for the silicothermic reduction process is removed as silicon dioxide ($SiO_2$), large quantities of $CO_2$ are released in the production of the ferrosilicon reductant, and in the generation of the high temperatures that are required for the reaction to proceed.

Thus, it is desirable to develop an improved process of producing magnesium metal.

SUMMARY OF THE INVENTION

The present invention relates to a process of producing magnesium metal. Water may or may not be formed as a byproduct. Magnesium carbonate is provided, and used either to sequester carbon dioxide, and/or to produce a magnesium-containing compound and carbon dioxide. The magnesium-containing compound can be reacted to produce magnesium metal. Carbon dioxide can be used as a reactant in a second process.

The invention also relates to a process of producing magnesium metal in which a magnesium-containing compound is reacted in an industrial-scale reactor to produce magnesium metal. The process results in substantially no net production of carbon dioxide or chlorine.

The invention also relates to a system for producing at least one of magnesium carbonate and magnesium metal. A first subsystem comprises: (a) a supply of a magnesium silicate entering the first subsystem; (b) reaction apparatus that converts the magnesium silicate to magnesium hydroxide and an alkali-metal silicate with the use of a caustic material; (c) reaction apparatus that converts the magnesium hydroxide to magnesium carbonate with the use of carbon dioxide; and (d) apparatus for exiting the magnesium carbonate from the first subsystem in order to sequester the carbon dioxide in the magnesium carbonate. A second subsystem comprises: (a) apparatus for conveying the magnesium carbonate from the first subsystem to the second subsystem; (b) apparatus for reacting the magnesium carbonate to produce a magnesium-containing compound and carbon dioxide; (c) apparatus for recycling the carbon dioxide from the second subsystem back to the first subsystem; and (d) apparatus for reacting the magnesium-containing compound to produce magnesium metal.

The invention also relates to a system for producing magnesium metal in which a supply of a magnesium silicate enters the system. Reaction apparatus converts the magnesium silicate to magnesium metal, with substantially no net production of carbon dioxide or chlorine. The magnesium metal exits the system as a product.

The invention also relates to a process of producing magnesium metal in which a magnesium silicate is reacted with a caustic material to produce magnesium hydroxide. The magnesium hydroxide is reacted with a source of carbon dioxide to produce magnesium carbonate. The magnesium carbonate is reacted to produce a magnesium-containing compound and carbon dioxide. The magnesium-containing compound is reacted to produce magnesium metal.

The invention also relates to a process of producing magnesium metal comprising: (a) reacting a magnesium silicate with a caustic material to produce magnesium hydroxide; (b) reacting carbon dioxide with an alkali-metal silicate to produce silica and alkali-metal bicarbonate; (c) reacting the alkali-metal bicarbonate with the magnesium hydroxide to produce alkali-metal carbonate and magnesium carbonate; (d) reacting the alkali-metal carbonate with an alkaline-earth metal hydroxide to form a carbonate of the alkaline-earth metal and a caustic hydroxide of the alkali metal; (e) calcining the alkaline-earth metal carbonate to form an oxide of the alkaline-earth metal and carbon dioxide; (f) reacting the alkaline-earth metal oxide with water to substantially regenerate the alkaline-earth metal hydroxide consumed in step (d); and (g) reacting the magnesium carbonate from step (c) in one or more reaction steps to produce magnesium metal.

In one embodiment, the invention relates to a process of producing magnesium metal in which the sodium hydroxide used as a reactant in an initial step of the process is recovered in a later step of the process and recycled. For example, steps 5-7 in FIGS. 1-4 illustrate this use and recovery of sodium hydroxide. The process comprises: (a) reacting a magnesium silicate with sodium hydroxide to produce magnesium hydroxide; (b) reacting the magnesium hydroxide with sodium bicarbonate to produce magnesium carbonate and sodium carbonate; (c) reacting the magnesium carbonate in one or more reactions to produce magnesium metal; (d) reacting the sodium carbonate with a metal hydroxide to produce sodium hydroxide; and (e) recycling the sodium hydroxide from step (d) into step (a). In one embodiment the metal hydroxide of step (d) is calcium hydroxide.

The invention further relates to the magnesium metal produced by any of the above-described processes.

DETAILED DESCRIPTION OF THE PREFERRED EMBODIMENTS

Figure 1:
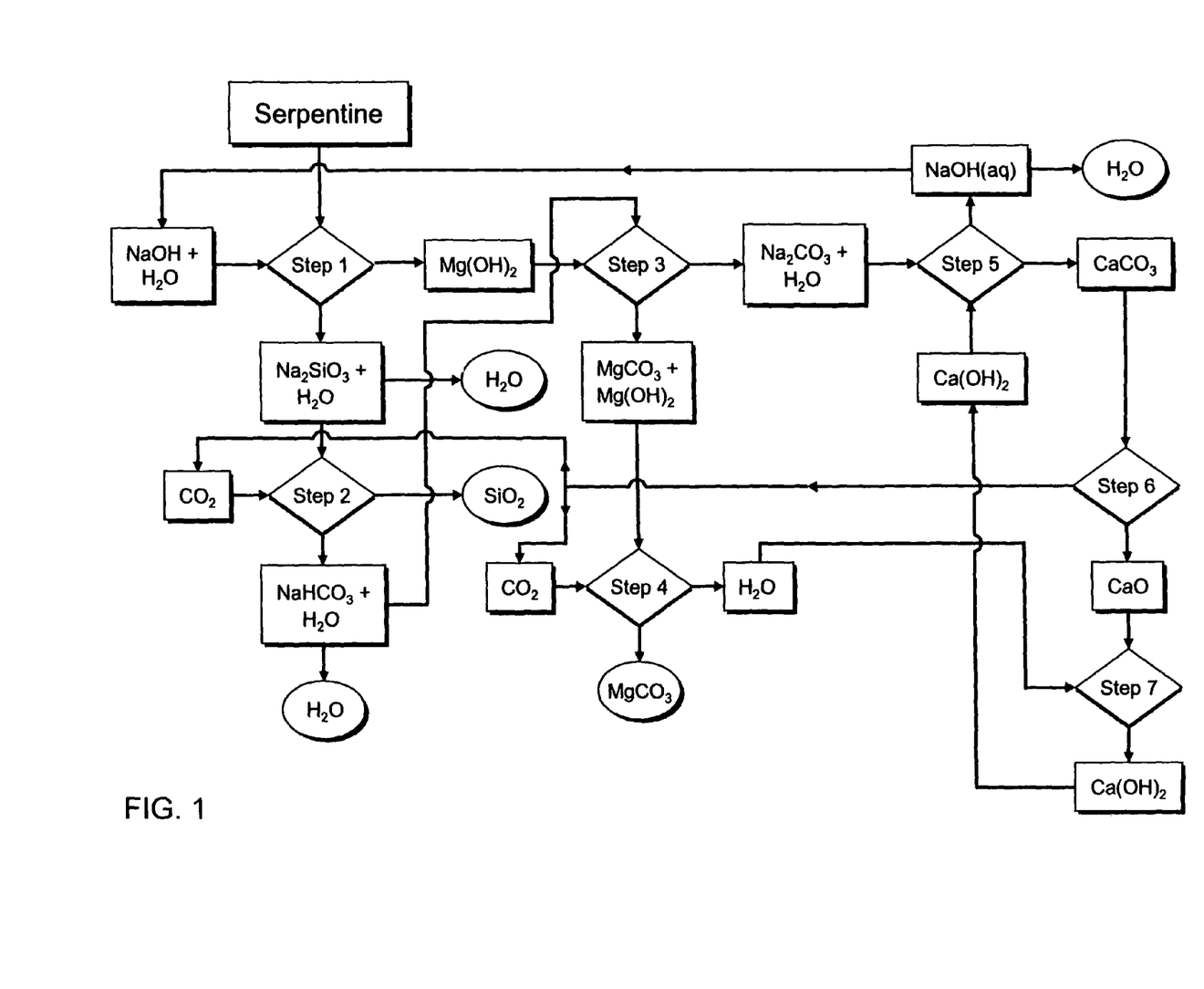
FIG. 1 is a simplified flow chart for the production of magnesium carbonate from serpentine by a carbonation process that can be used as part of the invention.
Figure 2:
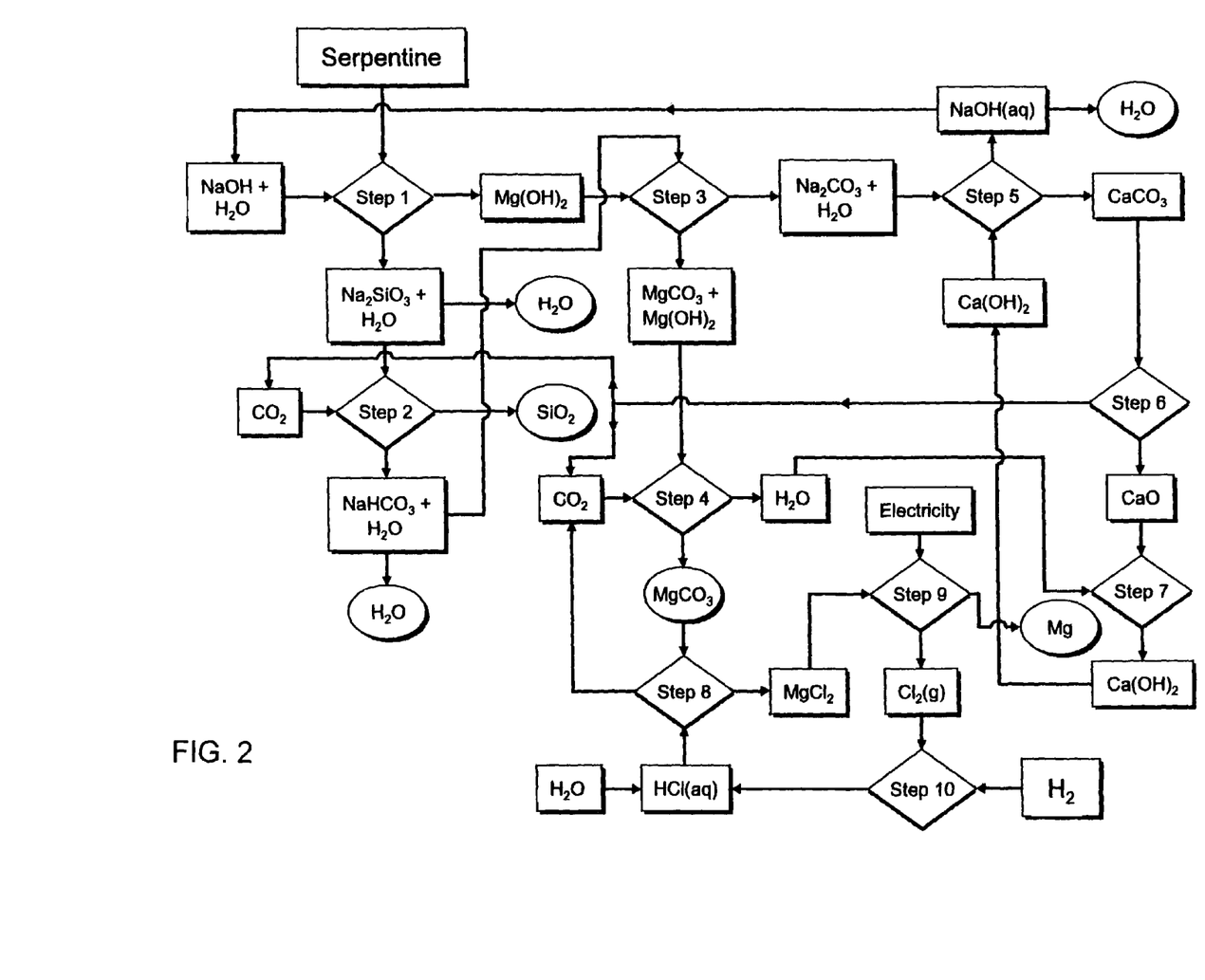
FIG. 2 is a simplified flow chart for the production of magnesium metal from serpentine according to one embodiment of the invention.
Figure 3:
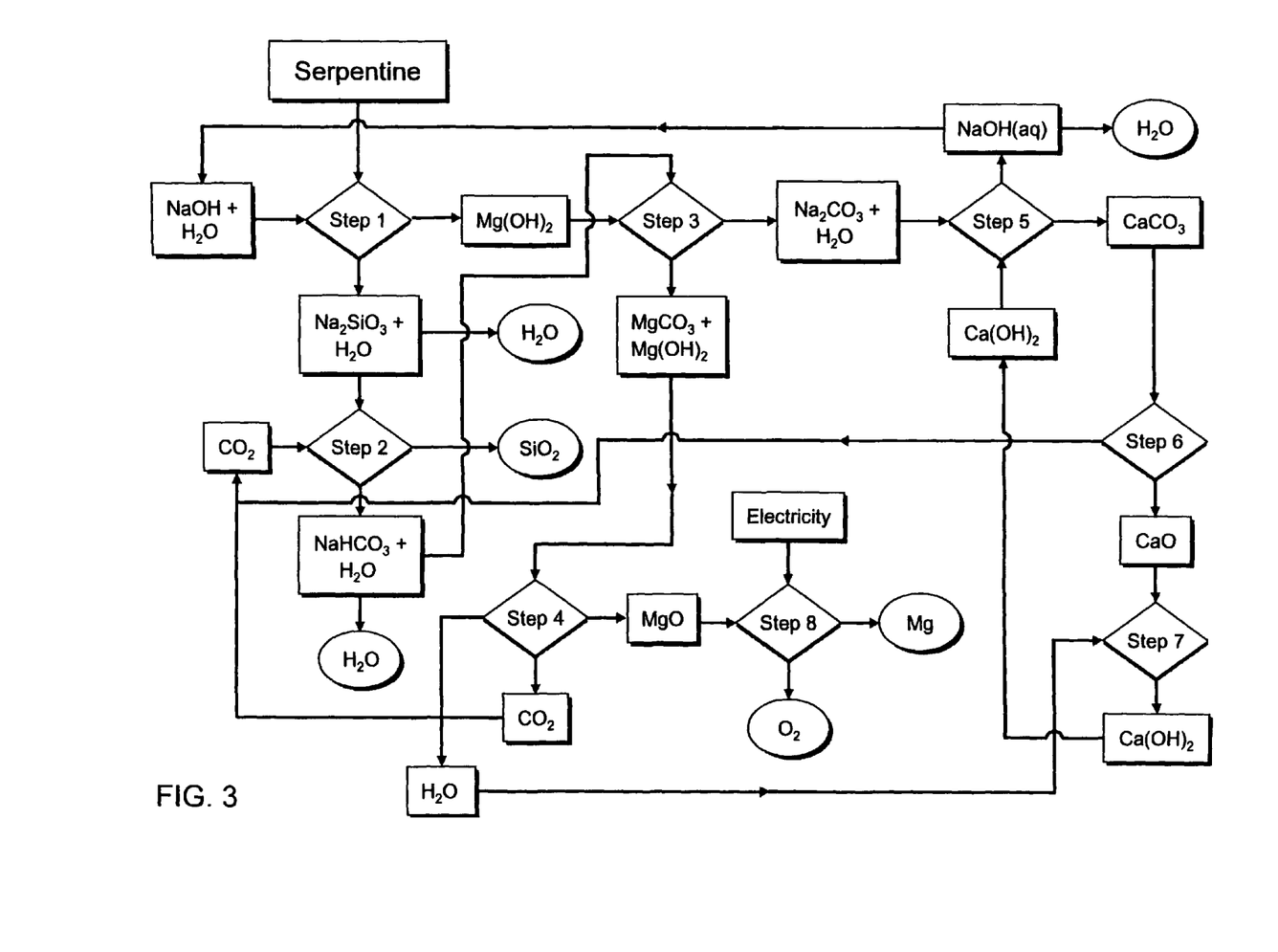
FIG. 3 is a simplified flow chart for the production of magnesium metal from serpentine according to another embodiment of the invention.
Figure 4:
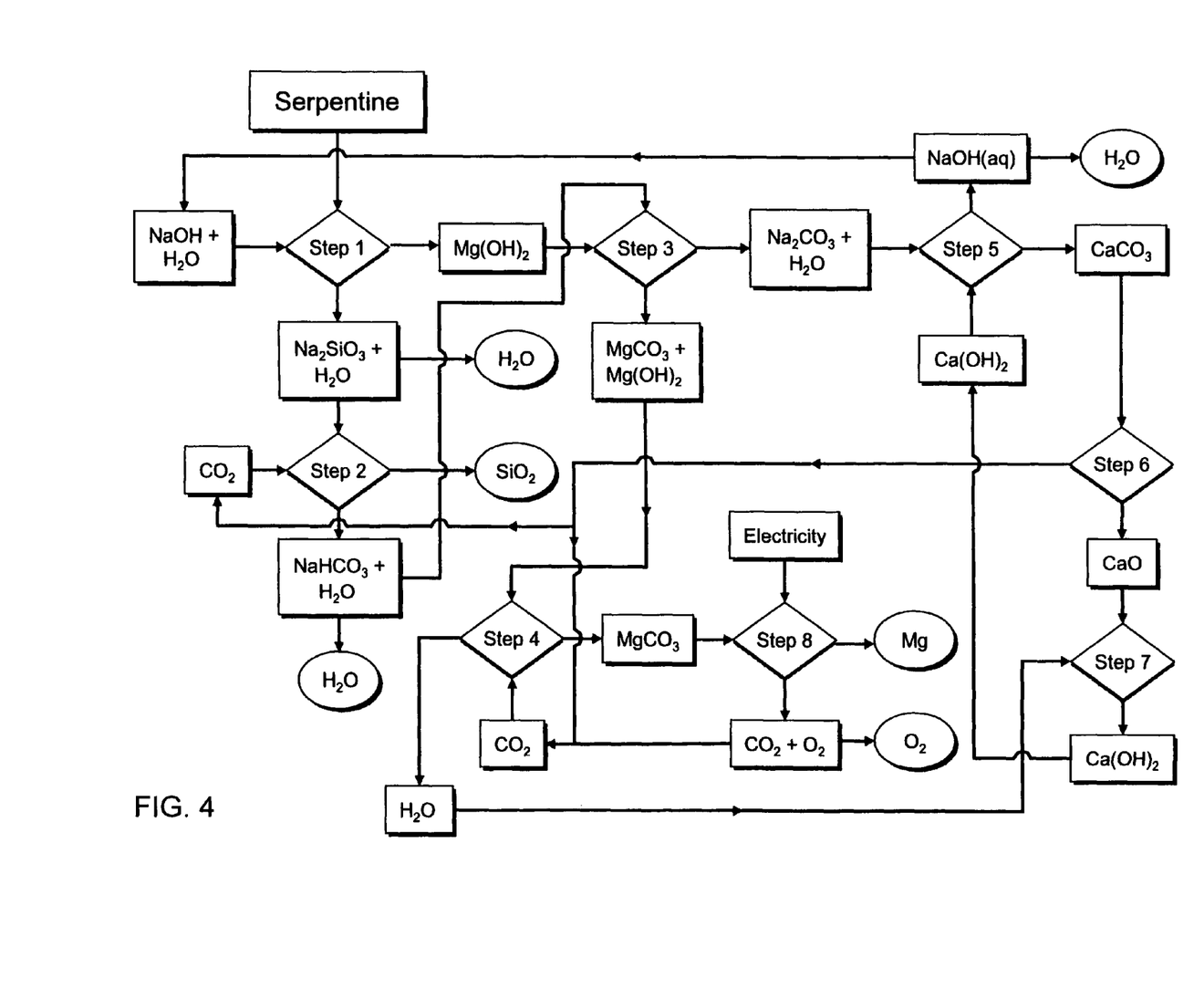
FIG. 4 is a simplified flow chart for the production of magnesium metal from serpentine according to a further embodiment of the invention.

The invention relates to an improved process of producing magnesium metal. In some embodiments of the invention, magnesium carbonate is used as a reactant. The magnesium carbonate can be provided in any suitable manner. For example, it can be purchased from a chemical supplier, or it can be provided as the product of a preceding chemical process. FIG. 1 is a flow chart for a chemical process that uses serpentine, caustic soda (NaOH), and $CO_2$ to produce $MgCO_3$, $SiO_2$ and $H_2O$. FIGS. 2-4 illustrate embodiments of the invention in which magnesium carbonate is provided as a product of the serpentine carbonation process illustrated in FIG. 1. The serpentine carbonation process is discussed in more detail below.

The magnesium carbonate is reacted to produce a magnesium-containing compound and carbon dioxide. Any suitable reactions, co-reactants and reaction conditions can be used. In some embodiments, the magnesium-containing compound is either magnesium chloride ($MgCl_2$) or magnesium oxide (MgO), the two primary industrial feedstocks for producing magnesium metal by electrolysis or thermal reduction. In the embodiment shown in FIG. 2, the magnesium carbonate is reacted with HCl in step 8 to produce $MgCl_2$ and carbon dioxide by the reactions:

$$MgCO_3(s)+2HCl(aq)+5H_2O(aq) \rightarrow MgCl_2.6H_2O(s)+ CO_2(g) \quad (1)$$

and $$MgCl_2.6H_2O(s) \rightarrow MgCl_2(s)+6H_2O(aq) \quad (2)$$

(s=solid, aq=aqueous, g=gas). [Note: The label "$MgCl_2$" in the rectangle to the right of step 8 in FIG. 2 represents the chloride salt $MgCl_2.xH_2O$, where x is a number between 0 and 6. The partial/complete dehydration of $MgCl_2.6H_2O$ typically performed prior to electrolysis is not shown in FIG. 2 for the sake of simplicity and generality in graphically representing the processing steps that produce magnesium metal from $MgCl_2.6H_2O$.] In the embodiment shown in FIG. 3, the $MgCO_3+Mg(OH)_2$ product stream from step 3 of the serpentine carbonation process is calcined in step 4 to produce MgO, carbon dioxide and water. In the embodiment shown in FIG. 4, the $MgCO_3+Mg(OH)_2$ product stream from step 3 of the serpentine carbonation process is fully carbonated in step 4 to produce $MgCO_3$ and water.

In the embodiments illustrated in FIGS. 2-4, the magnesium-containing compound is reacted to produce magnesium metal. Any suitable reactions, co-reactants and reaction conditions can be used. In the embodiment shown in FIG. 2, the $MgCl_2$ is subjected to electrolysis in step 9 to produce magnesium metal (Mg) and chlorine gas. In the embodiment shown in FIG. 3, the MgO is subjected to hydrolysis in step 8 to produce magnesium metal and oxygen gas. In the embodiment shown in FIG. 4, the $MgCO_3$ is subjected to hydrolysis in step 8 to produce magnesium metal, carbon dioxide, and oxygen. FIGS. 2-4 show that the serpentine carbonation process, which can be used as part of the invention, is highly compatible with technologies for extracting magnesium metal from $MgCl_2.6H_2O$, MgO and $MgCO_3$.

The carbon dioxide that is produced is used as a reactant in another process. Advantageously, this reduces or eliminates the emission of carbon dioxide from the overall process. In some embodiments, the process results in substantially no net production of carbon dioxide. The other process can be any type of process that consumes carbon dioxide. For example, the other process can be a mineral carbonation process. In some embodiments, the carbon dioxide is recycled such that the mineral carbonation process provides the magnesium carbonate that is used as a reactant in the present process.

An example of a mineral carbonation process that can be used in the invention is described in U.S. application Ser. No. 10/706,583, filed Nov. 12, 2003, now abandoned, published as U.S. patent application pub. no. US 2004/0213705 A1 on Oct. 28, 2004, which is incorporated by reference herein. FIGS. 1-4 show that a mineral carbonation process known as serpentine carbonation can be used to produce magnesium carbonate. This serpentine carbonation process, used as part of the magnesium metal production process of the invention, affords the benefit that complete internal recycling of $CO_2$ is achieved, thereby decreasing or eliminating the amount of $CO_2$ emitted to the atmosphere. This stands in marked contrast to conventional magnesium metal production technologies, which emit copious amounts of $CO_2$.

The mineral carbonation process described in U.S. application Ser. No. 10/706,583 can be used to carbonate many different types of metal-silicate feedstocks, including naturally occurring silicates such as those present in rocks and clay-rich formations, as well as silicates present in industrial waste products such as fly ash and waste concrete. Typically, the metal-silicate feedstock is composed of one or more calcium silicates, magnesium silicates, iron-bearing silicates (such as basalt), or mixtures thereof, although other types of silicates can also be used. (Silicate feedstocks are referred to collectively herein as "metal silicates" with the understanding that this designation includes any natural or man-made material, in the crystalline or amorphous state, that contains at least one metal along with silicon. By this definition, aluminosilicates are metal silicates because they contain a metal, aluminum, along with silicon.)

Natural magnesium-rich silicates include olivine (specifically forsterite, $Mg_2SiO_4$, and forsteritic olivine, $(Mg,Fe)SiO_4$), serpentine ($Mg_3Si_2O_5(OH)_4$), and basalt. Significant masses of olivine- and serpentine-bearing rocks exist around the world, particularly in ultramafic complexes, and in large serpentinite bodies.

In one embodiment of the mineral carbonation process, one or more metal silicates are transformed to one or more solid, alkaline-earth hydroxides by reaction with a caustic alkali-metal hydroxide, such as caustic soda (NaOH), in aqueous solution. In other words, the metal silicate(s) react with the caustic alkali-metal hydroxide to produce a hydroxide of the alkaline-earth metal formerly contained in the silicate. This initial reaction is usually followed by physical and chemical segregation of the produced solid(s) and "depleted" caustic liquid. In addition, it may be desirable to separate the solid, alkaline-earth metal hydroxide(s) from any residual solid silicate and/or oxide material that forms as a byproduct of caustic digestion (e.g., magnetite, $Fe_3O_4$).

Any suitable concentration of the caustic alkali-metal hydroxide in aqueous solution can be used to decompose the metal-silicate feedstock, including highly concentrated and very dilute solutions. The caustic solution is typically fairly concentrated, comprising, by weight, from about 30% to about 80% alkali-metal hydroxide and from about 20% to about 70% water.

An initial intermediate step in the process (step 2 in FIG. 1) involves reacting carbon dioxide with alkali metal silicate (e.g., $Na_2SiO_3$) to produce alkali-metal bicarbonate (e.g., $NaHCO_3$) and/or alkali-metal carbonate (e.g., $Na_2CO_3$) and silica in either gelatinous or solid form. This step may or may not be followed by precipitation of the $NaHCO_3$ and/or $Na_2CO_3$, which could be achieved by shifting the pH of the aqueous solution (removal of $CO_2$ would tend to make the solution less acidic), or by evaporating off some of the water present.

In a subsequent intermediate step of the process (step 3 in FIG. 1), the alkaline-earth metal hydroxide formed in the first step and the alkali-metal bicarbonate and/or alkali-metal carbonate formed in the previous step are reacted to produce a carbonate of the alkaline-earth metal formerly contained in the metal silicate (generally, some residual, solid unreacted alkaline-earth metal hydroxide will be present after this step). This reaction can be induced at any suitable set of temperature-pressure conditions. After reaction is nearly complete, the liquid and solid reaction products are separated into two streams for further processing.

The liquid stream, consisting mainly of water, alkali-metal carbonate, and/or alkali-metal bicarbonate, is reacted with a metal hydroxide (e.g., $Ca(OH)_2$) to produce a solid metal carbonate (e.g., $CaCO_3$) and a caustic alkali-metal hydroxide (e.g., NaOH), the latter in aqueous solution (step 5 in FIG. 1). The caustic aqueous solution is separated from the solid metal carbonate and recycled back to the first step of the process. The solid metal carbonate that remains is converted back to a hydroxide of the metal, first, by calcining the carbonate to produce an oxide of the metal (e.g., CaO) plus $CO_2$ (step 6 in FIG. 1), and second, by reacting the oxide of the metal with water to reform the hydroxide of the metal (step 7 in FIG. 1). This metal hydroxide is recycled back to the step discussed above wherein alkali-metal carbonate and/or alkali-metal bicarbonate in aqueous solution is reacted with a metal hydroxide to produce a solid metal carbonate and a caustic alkali-metal hydroxide in aqueous solution (step 5 in FIG. 1).

The solid stream, consisting of a carbonate of a metal and a hydroxide of the same metal (e.g., $MgCO_3+Mg(OH)_2$), is reacted with carbon dioxide to produce additional metal carbonate.

Thus, more generally, the process of carbonating a metal silicate comprises the steps of: (a) reacting the metal silicate with a caustic material to produce a hydroxide of the metal; (b) reacting the metal hydroxide with a source of carbon dioxide to produce a carbonate of the metal; (c) reconstituting the caustic material, and recycling it back into step (a); and (d) recovering and reusing the carbon dioxide produced by calcining a metal carbonate. The caustic material can be a caustic alkali-metal hydroxide or any other suitable caustic material.

In each step involving water or an aqueous solution, reaction can be induced at a pressure not greater than about 50 bars above the vapor pressure of pure water for the temperature of that step, typically not greater than about 30 bars, and more typically not greater than about 20 bars, and often not greater than about 10 bars. The initial step may be conducted at a pressure slightly below the vapor pressure of pure water for the temperature of that step. Achieving rapid chemical reaction at low pressure is an advantage because relatively thin-walled pressure chambers will suffice to safely contain the aqueous liquids (±gas) as reaction proceeds. This will reduce the costs of commercial reactors built to implement the process on an industrial scale. Moreover, when total pressure is equal to the vapor pressure of the liquid phase, no investments in expensive pressure-intensifying equipment are required. On the other hand, higher fluid (liquid and/or gas) pressures at each step, particularly the steps in which $CO_2$ is consumed, could lead to more rapid and efficient chemical reaction, in which case additional capital expenditures to make the carbonation reactor more structurally robust, and to procure suitable pumping equipment, might be cost effective.

More generally, the process of carbonating a metal silicate comprises reacting at least the metal silicate and a source of carbon dioxide to produce a carbonate of the metal, wherein the reaction is conducted at a pressure not greater than about 50 bars above the vapor pressure of pure water for the temperature of the reaction. However, it may be beneficial to pressurize $CO_2$-bearing gas to a level above the vapor pressure of pure water for the temperature of the step in which it is reacted, prior to, or during, production of metal carbonate(s) and/or metal bicarbonate(s) in order to accelerate rates of carbonation. If $CO_2$ is captured, separated and liquified by another process, then pressures up to ~64 atm (the vapor pressure of pure liquid $CO_2$ at 25° C.) could be achieved simply by throttling flow of $CO_2$ into the pressure chamber used to achieve carbonation.

In each step of the process, the extent to which aqueous liquids are agitated or stirred, and control of the proportions of phases as reaction proceeds, can be varied.

More generally, the process of carbonating a metal silicate comprises the steps of: (a) reacting the metal silicate with a caustic alkali-metal hydroxide to produce a hydroxide of the metal formerly contained in the silicate; and (b) reacting the metal hydroxide with a source of carbon dioxide to produce a carbonate of the metal formerly contained in the metal silicate of step (a). A process of producing a metal carbonate comprises reacting a metal hydroxide with at least one of an alkali-metal carbonate, an alkali-metal bicarbonate, and carbon dioxide, to produce a carbonate of the metal formerly contained in the metal hydroxide.

Reaction pathways for producing magnesium carbonate from the magnesium-rich minerals olivine (specifically forsterite, $Mg_2SiO_4$) and serpentine are shown below (s=solid, aq=aqueous solution, g=gas). The Reactions (10)-(16) for carbonating serpentine are also illustrated in FIGS. 1, 2 and 4 as steps 1-4.

$$Mg_2SiO_4(s)+2NaOH(aq)+H_2O(aq)\rightarrow 2Mg(OH)_2(s)+Na_2SiO_3(aq) \quad (3)$$

olivine brucite $$Na_2SiO_3(aq)+2CO_2(g)+H_2O(aq)\rightarrow SiO_2(s)+2NaHCO_3(aq) \quad (4)$$

silica $$Mg(OH)_2(s)+2NaHCO_3(aq)\rightarrow MgCO_3(s)+Na_2CO_3(aq)+2H_2O(aq) \quad (5)$$

brucite magnesite $$Mg(OH)_2(s)+CO_2(g)\rightarrow MgCO_3(s)+H_2O(aq) \quad (6)$$

brucite magnesite $$Na_2CO_3(aq)+Ca(OH)_2(s)\rightarrow CaCO_3(s)+2NaOH(aq) \quad (7)$$

portlandite calcite $$CaCO_3(s)\rightarrow CaO(s)+CO_2(g) \quad (8)$$

calcite lime $$CaO(s)+H_2O(aq)\rightarrow Ca(OH)_2(s) \quad (9)$$

lime portlandite

[Net reaction: $Mg_2SiO_4+2CO_2\rightarrow 2MgCO_3(s)+SiO_2(s)$]

$$Mg_3Si_2O_5(OH)_4(s)+4NaOH(aq)\rightarrow 3Mg(OH)_2(s)+2Na_2SiO_3(aq)+H_2O(aq) \quad (10)$$

serpentine brucite $$2Na_2SiO_3(aq)+4CO_2(g)+2H_2O(aq)\rightarrow 2SiO_2(s)+4NaHCO_3(aq) \quad (11)$$

silica $$2Mg(OH)_2(s)+4NaHCO_3(aq)\rightarrow 2MgCO_3(s)+2Na_2CO_3(aq)+4H_2O(aq) \quad (12)$$

brucite magnesite $$Mg(OH)_2(s)+CO_2(g)\rightarrow MgCO_3(s)+H_2O(aq) \quad (13)$$

brucite magnesite $$2Na_2CO_3(aq)+2Ca(OH)_2(s)\rightarrow 2CaCO_3(s)+4NaOH(aq) \quad (14)$$

portlandite calcite $$2CaCO_3(s)\rightarrow 2CaO(s)+2CO_2(g) \quad (15)$$

calcite lime $$2CaO(s)+2H_2O(aq)\rightarrow 2Ca(OH)_2(s) \quad (16)$$

lime portlandite

[Net reaction: $Mg_3Si_2O_5(OH)_4(s)+3CO_2(g)\rightarrow 3MgCO_3(s)+2SiO_2(s)+2H_2O(aq)$]

In Reaction (10), no heat pretreatment of the serpentine is required to achieve rapid and efficient production of $Mg(OH)_2$. This contrasts sharply with the so-called "direct" method for carbonating serpentine (by the reaction $Mg_3Si_2O_5(OH)_4+3CO_2\rightarrow 3MgCO_3+2SiO_2+2H_2O$), which requires heat pretreatment of the serpentine at ~600° C. to drive off structurally bound water. This extra step is necessary in the direct method of carbonating serpentine because untreated (hydroxylated) serpentine reacts sluggishly with $CO_2$, whereas "dewatered" (dehydroxylated) serpentine is much more reactive. Dehydroxylation of serpentine makes the direct carbonation method very energy intensive and costly. In this regard, it is also noteworthy that the present process, as applied to either olivine or serpentine, largely conserves the "rock solvent" (e.g., NaOH), which lowers overall processing costs. By contrast, in the direct method for carbonating olivine and serpentine, the rock solvent is (effectively) compressed, supercritical $CO_2$, which is expensive to create due to the high capital and operating costs of the mechanical pumping that is required to achieve fluid pressures as high as 185 atm.

It should be understood that the chemical formulae for the solutes (substances dissolved in aqueous solution) in Reactions (3)-(5), (7), (10)-(12) and (14) (specifically NaOH, $NaHCO_3$, and $Na_2SiO_3$) represent stoichiometric components in aqueous solution, not "real" aqueous species. This convention was adopted for the sake of generality and simplicity. The particular species in aqueous solution created by the process (presently unknown) are of considerable scientific interest; however, they need not be represented explicitly in sets of process reactions such as those above, because the solids that form and disappear in each process reaction, as well as the net carbonation reaction for each metal silicate, do not depend on the chemical formulae that are used to represent the compositions of solutes. A simple example illustrates this point. In Reactions (3)-(5), the stoichiometric components NaOH, $Na_2SiO_3$ and $NaHCO_3$ and $Na_2CO_3$ can be replaced by the ionic species $OH^-$, $SiO(OH)_3^-$, $HCO_3^-$ and $CO_3^{2-}$ with sodium ion and calcium-bearing solids omitted because there is no net consumption or production of either in the overall carbonation process. This leads to the following alternative carbonation pathway for olivine (forsterite):

$$Mg_2SiO_4(s)+OH^-(aq)+3H_2O(aq)\rightarrow 2Mg(OH)_2(s)+SiO(OH)_3^-(aq) \quad (17)$$

$$SiO(OH)_3^-(aq)+CO_2(g)\rightarrow SiO_2(s)+HCO_3^-(aq)+H_2O(aq) \quad (18)$$

$$Mg(OH)_2(s)+2HCO_3^-(aq)\rightarrow MgCO_3(s)+CO_3^{2-}(aq)+2H_2O(aq) \quad (19)$$

$$CO_3^{2-}(aq)+H_2O(aq)\rightarrow HCO_3^-(aq)+OH^-(aq) \quad (20)$$

$$Mg(OH)_2(s)+CO_2(g)\rightarrow MgCO_3(s)+H_2O(aq) \quad (21)$$

[Net reaction: $Mg_2SiO_4(s)+2CO_2(g)\rightarrow 2MgCO_3(s)+SiO_2(s)$].

Comparing Reactions (17)-(21) with Reactions (3)-(9), it is evident that the solids consumed and produced, and the net reaction, are identical. Therefore, it should be clearly understood that the scope of the process for carbonating metal silicates includes various self-consistent sets of reactions—i.e., sets of reactions involving the same solids, with metal silicate digestion by one or more caustic metal hydroxides (such as NaOH)—wherein solutes are represented by aqueous species of varying composition and charge, rather than by stoichiometric components.

In another embodiment, the process provides a means for carbonating magnesium and iron silicates in two steps. In step 1, the metal silicate(s) is (are) converted to $Mg(OH)_2$ and/or iron hydroxides(s)+$Na_2SiO_3\pm SiO_2$ by reaction with caustic soda in aqueous solution. When this conversion is essentially complete, carbonation of $Mg(OH)_2$ and/or iron hydroxide(s)

is (are) achieved by injecting $CO_2$ into the aqueous solution to form $NaHCO_3$ ($\pm Na_2CO_3$)+silica gel and/or solid silica (step 2). $MgCO_3$ and $FeCO_3$ are formed when the $Mg(OH)_2$ and iron hydroxide(s) produced in step 1 react(s) with $NaHCO_3$ ($\pm Na_2CO_3$) and/or $CO_2$. Physical and/or chemical segregation of solids and liquids is not required in the two-step process for carbonating Mg- and Fe-rich silicates.

In one embodiment, the invention relates to a process of producing magnesium metal in which the sodium hydroxide used as a reactant in an initial step of the process is recovered in a later step of the process and recycled. For example, steps 5-7 in FIGS. 1-4 illustrate this use and recovery of sodium hydroxide. The process comprises: (a) reacting a magnesium silicate with sodium hydroxide to produce magnesium hydroxide; (b) reacting the magnesium hydroxide with sodium bicarbonate to produce magnesium carbonate and sodium carbonate; (c) reacting the magnesium carbonate in one or more reactions to produce magnesium metal; (d) reacting the sodium carbonate with a metal hydroxide to produce sodium hydroxide; and (e) recycling the sodium hydroxide from step (d) into step (a). In one embodiment the metal hydroxide of step (d) is calcium hydroxide.

As described above, when the mineral carbonation process, or another process that uses carbon dioxide as a reactant, is used as part of the process of producing magnesium metal according to the invention, the emission of carbon dioxide from the overall process can be reduced or eliminated. It should further be noted that the process of producing magnesium metal can be practiced with no net production of chlorine, in contrast to many industrial magnesium manufacturing processes that produce undesirable amounts of chlorine. For example, in FIG. 2 it is shown that the chlorine produced in step 9 of the process is recycled as a reactant (HCl) in step 8 of the process, thereby avoiding release of chlorine from the process. Thus, more generally, the invention relates to a process of producing magnesium metal comprising reacting a magnesium-containing compound in an industrial-scale reactor to produce magnesium metal, the resulting process resulting in substantially no release of carbon dioxide or chlorine.

As illustrated, for example in FIGS. 2-4, in some embodiments the process includes a reaction that produces silicon dioxide. Further, in some embodiments the process results in substantially no net production of any materials besides magnesium metal, water, oxygen, and silicon dioxide.

Although the invention has been illustrated with respect to specific reactions and processes, the invention also includes other reactions and processes that achieve these results.

The invention also relates generally to a system for producing magnesium metal. The system includes a supply of a magnesium silicate entering the system. For example, a supply of magnesium silicate ore is transported by rail or trucks to a manufacturing plant, where it is used as the feedstock for the magnesium metal manufacturing process of the invention. The system also includes reaction apparatus which converts the magnesium silicate to the magnesium metal, with substantially no net production or release of carbon dioxide or chlorine. The reaction apparatus includes one or more reactors and related equipment, reactants, and other materials used to carry out the magnesium metal production. In some embodiments, the reaction apparatus produces magnesium carbonate as an intermediate product between the magnesium silicate and the magnesium metal, for example, as shown in FIGS. 2-4. The system further includes the magnesium metal product, which exits the system for use or sale.

When the mineral carbonation process is used as part of the magnesium metal production process of the invention, a manufacturing plant can be set up that has flexibility in producing either magnesium carbonate or magnesium metal. For example, if it is more attractive economically to use the plant to sequester carbon dioxide, the plant can receive a supply of carbon dioxide and use the mineral carbonation process to sequester the carbon dioxide by producing magnesium carbonate. The magnesium carbonate can then be disposed of by burial or other means. Alternatively, if it is more attractive economically to use the plant to produce magnesium metal, the mineral carbonation process can be used to produce magnesium carbonate ($\pm$magnesium hydroxide), and then the magnesium carbonate ($\pm$magnesium hydroxide) can be used as a feedstock for producing magnesium metal as described above. The carbon dioxide produced during the production of the magnesium metal is recycled as a reactant into the mineral carbonation process, so that the process does not emit carbon dioxide. As another alternative, the manufacturing plant can be used partially to sequester carbon dioxide and partially to produce magnesium metal.

Thus, the invention relates to a system for alternatively producing magnesium carbonate (to sequester carbon dioxide) and/or magnesium metal. The system includes a first subsystem comprising: (a) a supply of a magnesium silicate entering the first subsystem; (b) reaction apparatus that converts the magnesium silicate to magnesium hydroxide and an alkali-metal silicate with the use of a caustic material; (c) reaction apparatus that converts the magnesium hydroxide to magnesium carbonate with the use of carbon dioxide; and (c) apparatus for exiting the magnesium carbonate from the first subsystem in order to sequester the carbon dioxide in the magnesium carbonate. The system also includes a second subsystem comprising: (a) apparatus for conveying the magnesium carbonate from the first subsystem to the second subsystem; (b) apparatus for reacting the magnesium carbonate to produce a magnesium-containing compound and carbon dioxide; (c) apparatus for recycling the carbon dioxide from the second subsystem back to the first subsystem; and (d) apparatus for reacting the magnesium-containing compound to produce magnesium metal. The second subsystem may be turned on to produce the magnesium metal, and turned off when the magnesium carbonate is used to sequester carbon dioxide. Preferably, when the second subsystem is turned on, the system results in substantially no net production or release of carbon dioxide or chlorine.

The invention further relates to a process for producing magnesium metal or a magnesium compound where, after building up an initial inventory of carbon dioxide, in principle, and substantially in practice, an external source of carbon dioxide is only used to replace small amounts of "lost" carbon dioxide, and/or to increase the scale of production activity. When the process does use carbon dioxide, the carbon dioxide is largely generated by the process and recycled for use within the process, thereby largely eliminating the need for an external source. For example, FIGS. 2-4 show the generation and recycling of carbon dioxide within the magnesium production processes. Although this embodiment of the invention has been illustrated with respect to the production of magnesium metal, the invention is also applicable to processes of producing different magnesium compounds.

In another embodiment, a process of producing magnesium metal comprises the steps of: (a) reacting a magnesium silicate with a caustic material to produce magnesium hydroxide; (b) calcining the magnesium hydroxide to magnesium oxide; and (c) forming magnesium metal electrolytically from the magnesium oxide.

As shown in FIGS. 2-4, serpentine is a preferred magnesium silicate for use in the magnesium metal production process of the invention. Serpentine occurs widely on all continents and ocean floors, and is not currently used as a magnesium ore. However, because it is extremely rich in magnesium, contains no carbon or chlorine, and is more abundant naturally than three heavily exploited magnesium ores—dolomite ($MgCO_3.CaCO_3$), bischofite ($MgCl_2.6H_2O$) and carnallite ($MgCl_2.KCl.6H_2O$)—serpentine has the potential to become an inexpensive and environmentally benign source of huge amounts of magnesium metal.

With its numerous advantages over alternative magnesium ore-processing technologies—including the use of an abundant magnesium resource that is not currently being exploited, with minimal net production of $CO_2$, and substantially no release of $CO_2$ or chlorine—the process of the invention has the potential to significantly increase world production of magnesium.

In accordance with the provisions of the patent statutes, the principles and modes of operation of this invention have been explained and illustrated in its preferred embodiments. However, it must be understood that this invention may be practiced otherwise than as specifically explained without departing from its spirit or scope.

What is claimed is:

1. A process of producing magnesium metal comprising:
   (a) reacting a magnesium silicate with a caustic material to produce magnesium hydroxide;
   (b) reacting carbon dioxide with an alkali-metal silicate to produce silica and alkali-metal bicarbonate;
   (c) reacting the alkali-metal bicarbonate with the magnesium hydroxide to produce alkali-metal carbonate and magnesium carbonate;
   (d) reacting the alkali-metal carbonate with an alkaline-earth metal hydroxide to form a carbonate of the alkaline-earth metal and a caustic hydroxide of the alkali metal;
   (e) calcining the alkaline-earth metal carbonate to form an oxide of the alkaline-earth metal and carbon dioxide;
   (f) reacting the alkaline-earth metal oxide with water to substantially regenerate the alkaline-earth metal hydroxide consumed in step (d); and
   (g) reacting the magnesium carbonate from step (c) in one or more reaction steps to produce magnesium metal.

2. The process according to claim 1 wherein the magnesium silicate comprises serpentine and/or olivine.

3. The process according to claim 1 wherein the reaction (b) is conducted at a pressure not greater than about 50 bars above the vapor pressure of pure water for the temperature of the reaction.

4. A process of producing magnesium metal comprising:
   (a) reacting a magnesium silicate with sodium hydroxide to produce magnesium hydroxide;
   (b) reacting the magnesium hydroxide with sodium bicarbonate to produce magnesium carbonate and sodium carbonate;
   (c) reacting the magnesium carbonate in one or more reactions to produce magnesium metal;
   (d) reacting the sodium carbonate with a metal hydroxide to produce sodium hydroxide; and
   (e) recycling the sodium hydroxide from step (d) into step (a).

5. The process according to claim 4 wherein the metal hydroxide of step (d) is calcium hydroxide.

6. A process of producing magnesium metal comprising:
   reacting a magnesium-containing compound in an industrial-scale reactor to produce magnesium metal; and
   a later step of the process producing carbon dioxide that is recycled back to an earlier step of the process so that the overall process has substantially no net production of carbon dioxide.

7. A process of producing magnesium metal comprising:
   (a) reacting a magnesium silicate with a caustic material to produce magnesium hydroxide;
   (b) calcining the magnesium hydroxide to magnesium oxide; and
   (c) forming magnesium metal electrolytically from the magnesium oxide.

8. Net reaction products produced by the process defined in claim 1, the net reaction products consisting of magnesium metal, water, oxygen and silicon dioxide and excluding other materials.

* * * * *